(12) United States Patent
Chliwnyj et al.

(10) Patent No.: US 6,865,052 B2
(45) Date of Patent: Mar. 8, 2005

(54) APPARATUS AND METHOD TO CALIBRATE SERVO SENSORS IN A NOISY ENVIRONMENT

(75) Inventors: Alex Chliwnyj, Tucson, AZ (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 10/184,276

(22) Filed: Jun. 27, 2002

(65) Prior Publication Data

US 2004/0001277 A1 Jan. 1, 2004

(51) Int. Cl.[7] .............................................. G11B 5/584
(52) U.S. Cl. ................................................. 360/77.12
(58) Field of Search ............................. 360/77.12, 75, 360/78.02

(56) References Cited

U.S. PATENT DOCUMENTS

| | | | | |
|---|---|---|---|---|
| 4,677,505 A | * | 6/1987 | Nukada et al. | 360/77.12 |
| 5,294,791 A | * | 3/1994 | Pahr | 360/77.12 |
| 5,457,586 A | * | 10/1995 | Solhjell | 360/77.12 |
| 5,574,602 A | * | 11/1996 | Baca et al. | 360/77.12 |
| 5,617,269 A | * | 4/1997 | Gordenker et al. | 360/77.12 |
| 5,828,514 A | * | 10/1998 | Chliwnyj et al. | 360/77.12 |
| 5,844,814 A | * | 12/1998 | Chliwnyj et al. | 360/77.12 |
| 5,844,919 A | | 12/1998 | Glover et al. | |
| 5,923,494 A | * | 7/1999 | Arisaka et al. | 360/78.02 |
| 5,946,159 A | | 8/1999 | Chliwnyj et al. | 360/77.12 |
| 5,956,199 A | * | 9/1999 | Husky et al. | 360/75 |
| 5,999,359 A | * | 12/1999 | Fasen | 360/77.12 |
| 6,021,017 A | | 2/2000 | Asamura et al. | |
| 6,172,838 B1 | | 1/2001 | Ohba | |
| 6,219,198 B1 | | 4/2001 | Dobbek et al. | |
| 6,320,719 B1 | | 11/2001 | Albrecht et al. | |
| 6,462,899 B1 | * | 10/2002 | Chliwnyj et al. | 360/77.12 |
| 6,525,898 B1 | * | 2/2003 | Chliwnyj et al. | 360/77.12 |
| 6,661,600 B1 | * | 12/2003 | Chliwnyj et al. | 360/77.12 |
| 6,674,603 B2 | * | 1/2004 | Basham et al. | 360/77.12 |
| 2001/0040755 A1 | | 11/2001 | Szita | |

* cited by examiner

Primary Examiner—Sinh Tran
Assistant Examiner—James L Habermehl
(74) Attorney, Agent, or Firm—Dale F. Regelman

(57) ABSTRACT

A method and apparatus to calibrate a servo sensor disposed on a tape head located adjacent a moving magnetic tape is disclosed where that magnetic tape includes at least one servo edge comprising an interface between a first recorded signal and a second recorded signal, and where the servo sensor provides a servo signal, and where an independent position sensor provides an IPS signal. The method first samples the servo signal and the IPS signal, calculates a transfer function, and forms a first calibration curve. The method then forms an average residual error value. If that average residual error exceeds the maximum allowable residual error, then the method applies an offset to the first calibration curve to form a second calibration curve. That second calibration curve is saved for subsequent use during, for example, read/write/erase operations.

44 Claims, 13 Drawing Sheets

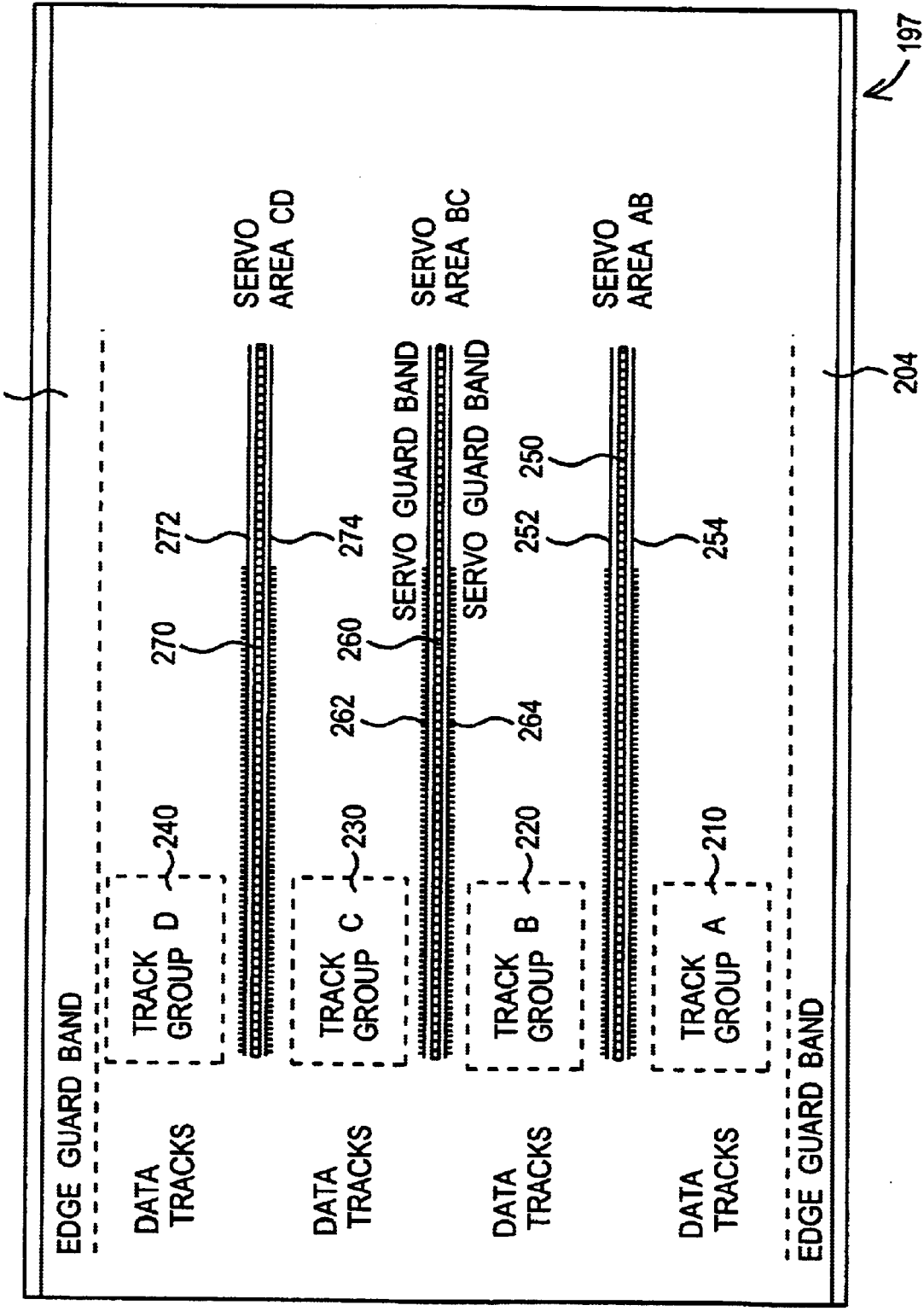

FIG. 2B

| HEAD TRACK NO. | HEAD MODULE | |
|---|---|---|
| | L | R |
| 1 | WR | RD |
| 2 | RD | WR |
| 3 | WR | RD |
| 4 | RD | WR |
| 5 | WR | RD |
| 6 | RD | WR |
| 7 | WR | RD |
| 8 | RD | WR | —272
| SERVO | LS1 | RS1 | —274
| SERVO | LS2 | RS2 | —278
| 9 | WR | RD | —276
| 10 | RD | WR |
| 11 | WR | RD |
| 12 | RD | WR |
| 13 | WR | RD |
| 14 | RD | WR |
| 15 | WR | RD |
| 16 | RD | WR | —262
| SERVO | LS3 | RS3 | —264
| SERVO | LS4 | RS4 | —268
| 17 | WR | RD | —266
| 18 | RD | WR |
| 19 | WR | RD |
| 20 | RD | WR |
| 21 | WR | RD |
| 22 | RD | WR |
| 23 | WR | RD |
| 24 | RD | WR | —252
| SERVO | LS5 | RS5 | —254
| SERVO | LS6 | RS6 | —258
| 25 | WR | RD | —256
| 26 | RD | WR |
| 27 | WR | RD |
| 28 | RD | WR |
| 29 | WR | RD |
| 30 | RD | WR |
| 31 | WR | RD |
| 32 | RD | WR |

275 groups 272, 274, 278, 276
265 groups 262, 264, 268, 266
255 groups 252, 254, 258, 256

APPARATUS AND METHOD TO CALIBRATE SERVO SENSORS IN A NOISY ENVIRONMENT

FIELD OF THE INVENTION

This invention relates to an apparatus and method to calibrate one or more servo sensors in a "noisy" environment. In certain embodiments, this invention relates to servo track following a moving magnetic tape having one or more servo edges of dissimilar recorded servo signals, and, more particularly, to calibrating one or more indexed servo positions offset laterally from those one or more servo edges.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in generating minimal guiding noise, and therefore, the step from a first ratio of servo signals to a second ratio is readily discernible.

Another approach, however, is required for open channel guiding in which the magnetic tape can move laterally a distance which is substantially greater than the separation between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the servo ratios.

SUMMARY OF THE INVENTION

Applicants' invention includes a method and apparatus to calibrate a servo sensor disposed on a tape head located adjacent a moving magnetic tape, where that magnetic tape includes at least one servo edge comprising an interface between a first recorded signal and a second recorded signal, and where the servo sensor detects that first recorded signal and that second recorded signal and provides a servo signal comprising the ratio of the detected first recorded frequency and the detected second recorded frequency, and where an independent position sensor provides an IPS signal comprising the lateral position of the tape head with respect to the tape path. Applicants' method first samples the servo signal and the IPS signal as the tape moves adjacent said servo sensor, and then generates (N) datapoints from that sampled servo signal/IPS signal data, where each of the $DP_{ACT(i)}$ members of those (N) datapoints comprises a measured servo signal and a corresponding measured IPS signal.

Applicants' method then calculates a transfer function curve using those (N) datapoints and an (n)th order curve fitting algorithm, and forms calculates (N) calculated datapoints $DP_{CAL(i)}$ determined using the transfer function. Applicants' method further includes setting a value for the maximum allowable residual error $RE_{MAX}$ for the first calibration curve. Applicants' method computes the residual error $RE_{(i)}$ for the (i)th one of said (N) calculated datapoints $DP_{CAL(i)}$, using the equation $RE_{(i)} = DP_{ACT(i)} - DP_{CAL(i)}$. In one embodiment, Applicants' method computes the average residual error, $RE_{AVG}$, using the values for RE(i), and then determines if $RE_{AVG}$ is greater than $RE_{MAX}$. If $RE_{AVG}$ is greater than $RE_{MAX}$, Applicants' method applies an offset to the first calibration curve to form a second calibration curve. That second calibration curve is saved for subsequent use during, for example, read/write/erase operations.

BRIEF DESCRIPTION OF THE DRAWINGS

The invention will be better understood from a reading of the following detailed description taken in conjunction with the drawings in which like reference designators are used to designate like elements, and in which:

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

FIG. 4C shows analog servo signals detected at a second index position;

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to calibrate servo sensors. The following description of Applicant's apparatus and method is not meant, however, to limit Applicant's invention to magnetic tapes or to data processing applications, as the invention herein can be applied generally to calibrating transducers in an electrically noisy environment.

Figure 1:
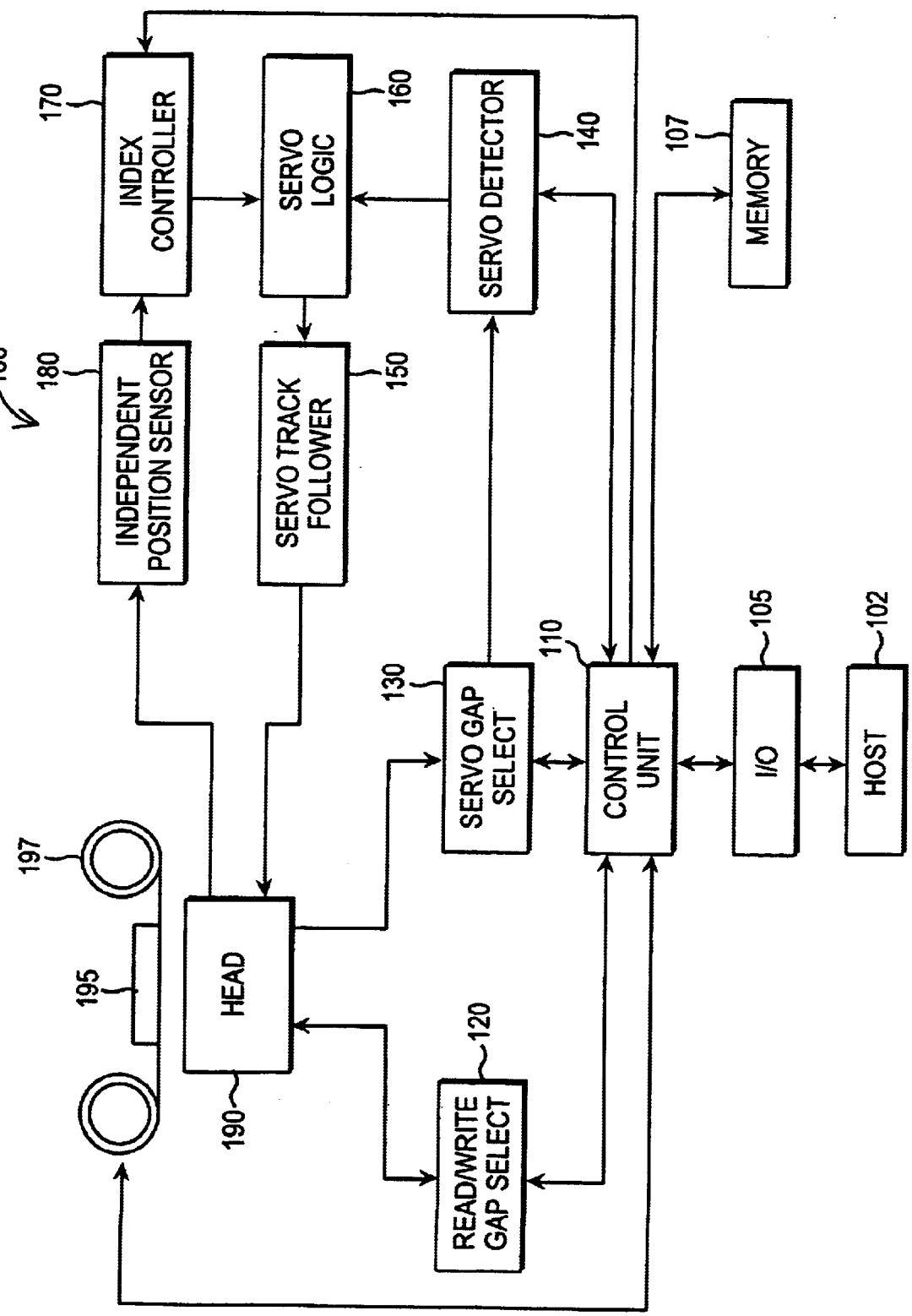
FIG. 1 is a block diagram of an embodiment of a magnetic tape system employing the present invention.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to read and/or record information from and/or to a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 258) corresponding to the three servo areas 250 (FIG. 2A), 260 (FIG. 2A), and 270 (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiment, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 in a first direction, and optionally in an opposing second direction, along a first axis, i.e. the longitudinal axis of the tape, while it is supported by a tape deck for reading and writing. In certain embodiments, the tape deck does not precisely hold the tape in position laterally. Rather in these embodiments, open channel guiding may be employed in which the magnetic tape can move laterally.

A servo track follower 150 directs the motion of the magnetic tape head 190 in a lateral or transverse direction relative to the longitudinal direction of tape motion, i.e. the tape head moves in a third and an opposing fourth direction along a second axis, where that second axis is substantially orthogonal to the first axis described above. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,946,159, where it is called a non-servo position sensor, and indicates the lateral mechanical position of the tape head 190 with respect to the tape path 195.

Over the course of longer distances of longitudinal tape movement, the open channel guiding system will allow the tape to move laterally with respect to the tape deck. In accordance with the present invention, the independent position sensor 180, in limited distances of tape movement, accurately tracks the lateral mechanical position of the tape head 190, and therefore of the servo sensor(s), with respect to the tape path 195. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to track a designated servo index position.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Figure 3A:
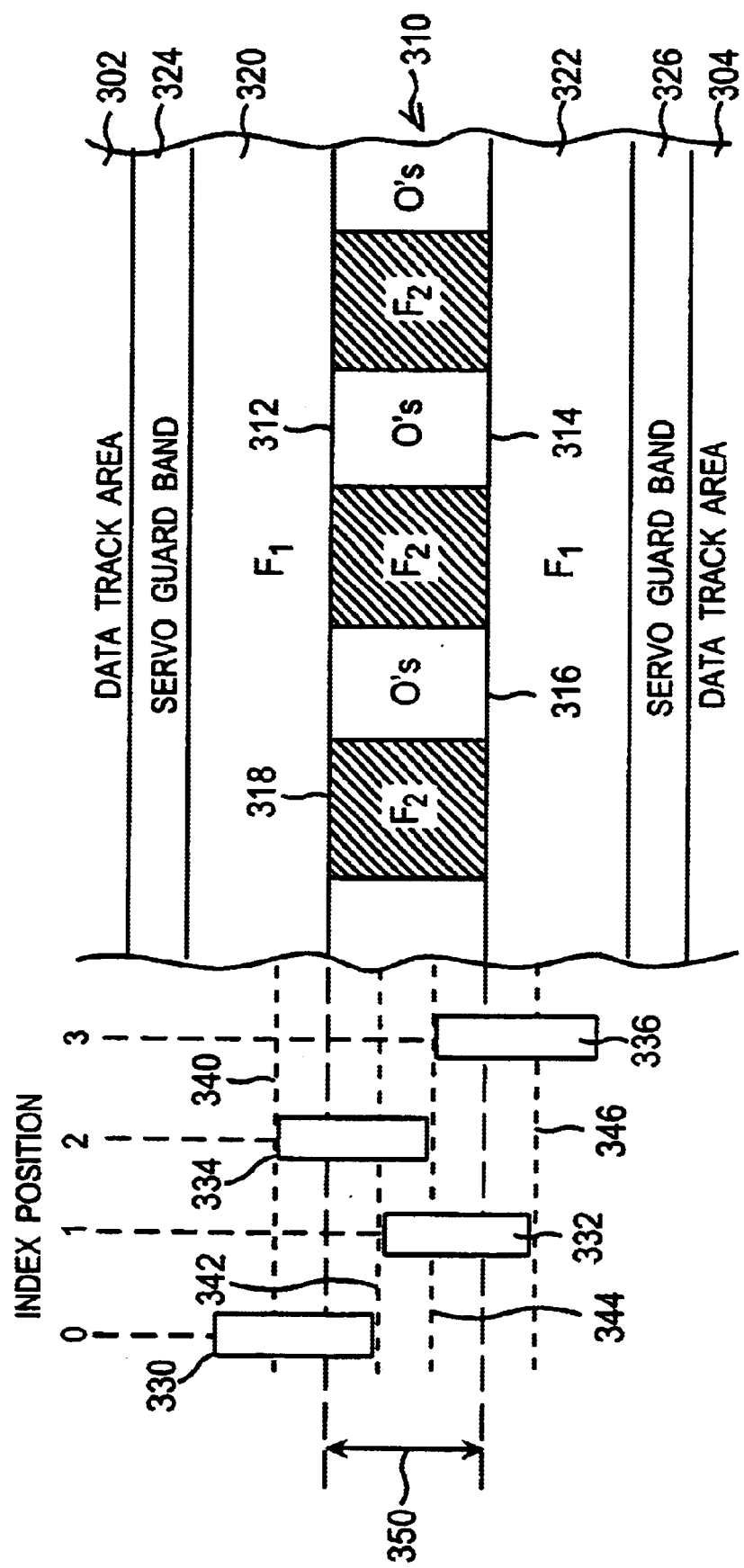
FIG. 3A is a detailed diagrammatic representation of a magnetic tape format providing four servo index positions in one set of two linear servo edges of the magnetic tape of FIG. 2A.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to sensor position 330 over tape track position 340. Similarly, index positions 1, 2, and 3, respectively, correspond to sensors positions 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. The servo sensors are substantially the same sensing width as the predetermined distance 350. The indexed positions are determined by measuring the ratio between the amplitudes of the two dissimilar recorded servo signals, e.g., as measured by the servo detector 140 of FIG. 1. The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

Figure 3B:
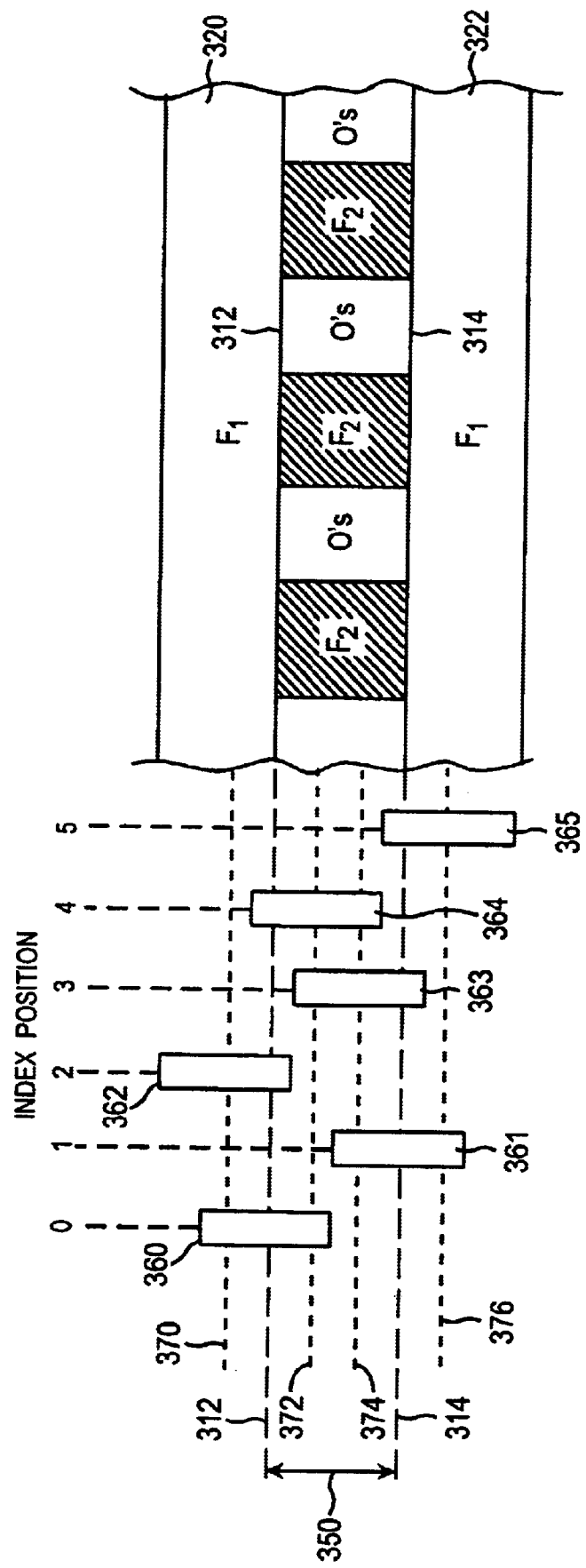
FIG. 3B is a detailed diagrammatic representation of a magnetic tape format providing six servo index positions in one set of two linear servo edges of the magnetic tape of FIG. 2A.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about 5/6 of the maximum signal, and to center the data read/write elements in the "3" and "4" index positions, the servo read element must be located at position 363 or at position 364, and will read a minimum signal that has an amplitude ratio of about 1/6 of the maximum signal.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo track follower 150 to position the tape head 190 to track follow at the desired displacement from the edges.

Figure 4A:
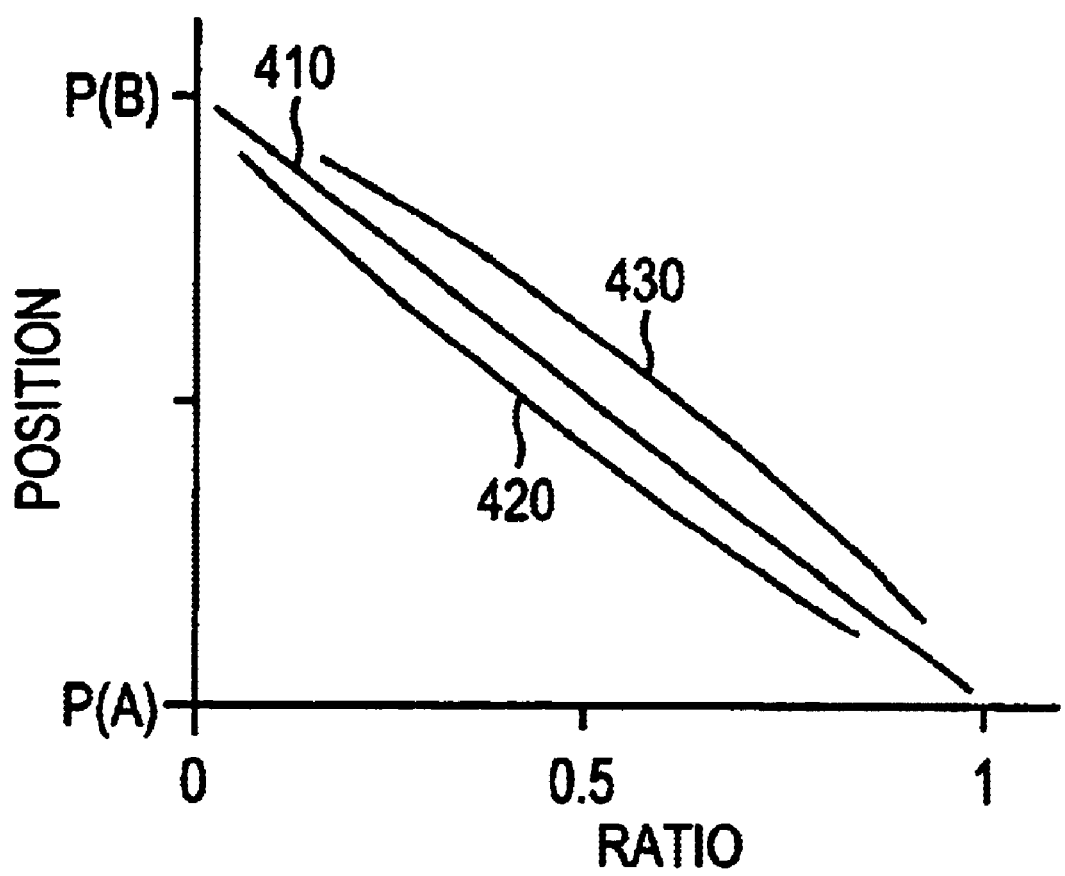
FIG. 4A is a diagrammatic representation of the relationships between ratios of the sensed servo signals of a servo edge of FIG. 2A and their corresponding lateral positions, where the recorded servo signals generating the edge are of three different amplitudes.

FIG. 4A illustrates examples of distortion of the measured ratios between the sensed servo signals of one linear servo edge, at various lateral positions of the servo sensors. Referring additionally to FIGS. 3A and 3B regarding servo sensor placement, in an ideal relationship, the ratio of signals varies linearly from a value of "1" when the servo sensor is at position $P_{(A)}$, which is centered on and senses only the outer band 320 or outer band 322, to a value of "0" when the servo sensor is at position $P_{(B)}$, which is centered on and senses only the inner band 310. Straight line 410 graphically illustrates such an ideal relationship.

Figure 4B:
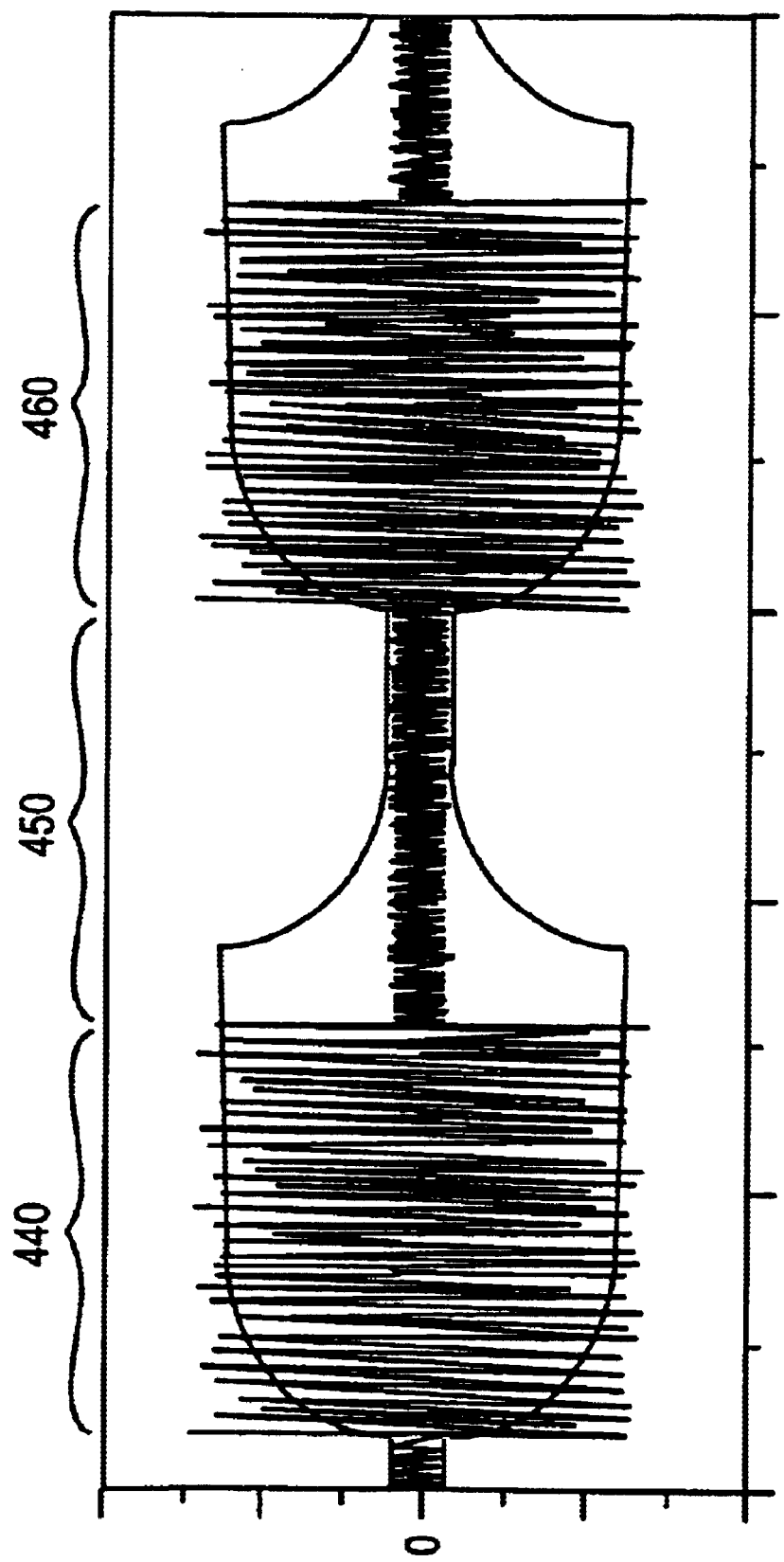
FIG. 4B shows analog servo signals detected at a first index position.

Curve 420 comprises a graphical representation of more typical ratios of servo signals, where the center recorded servo signal 310 generating the edges is of a relatively weak amplitude. FIGS. 4B and 4C illustrate wave forms of the analog signal from the servo transducer at, respectively, positions 332 and 336 of FIG. 3A. Thus, in FIG. 4B, the bursts 440 and 460 formed while the servo transducer is at position 332 of FIG. 3A from the combination of the first frequency and the second frequency burst is at a high amplitude, but the burst 450 formed from the combination of the first frequency and the null signal is at a very low amplitude because only a small portion of the servo transducer is positioned over the first frequency. In FIG. 4C, the bursts 470 and 490 formed while the servo transducer is at position 336 of FIG. 3A from the combination of the first frequency and the second frequency burst is at a high amplitude, as is the burst 480 formed from the combination of the first frequency and the null signal, because the servo transducer is positioned primarily over the first frequency.

Referring again to FIG. 4A, curve 430 comprises a graphical representation of more typical ratios of servo signals as a function of servo sensor location, where the center recorded servo signal 310 generating the edges is of a relatively strong amplitude. As those skilled in the art will appreciate, curves 420 and 430 do not show a linear relationship between the ratios of measured servo signals and servo sensor placement. In light of the differing, and complex, relationships between the ratios of measured servo signals as a function of servo sensor location, employing the same ratio setting to position the tape head at various servo index positions for each of the linear edges may result in track misregistration.

To enhance the accuracy with which a tape drive reads, and especially writes, information to a certain tape, such as tape 197, the tape drive, such as tape head 190, is calibrated each time a tape cartridge is mounted therein. Various methods are known in the art to accomplish such a calibration. For example, U.S. Pat. No. 5,629,813, assigned to the common assignee hereof, teaches a method to calibrate a tape drive wherein a newly mounted tape is moved and servo signal ratios, i.e. position error signals, are obtained and stored for future tape tracking. Pending Application having Publication No. 2003/0128457, assigned to the common assignee hereof, teaches a method to calibrate a tape drive wherein servo signal ratios in combination with independent sensor signals are detected and digital waveforms formed therefrom. Those digital waveforms are filtered using a Fast Fourier Transform/Inverse Fast Fourier Transform algorithms. Those filtered waveforms are then used to calibrate one or more index positions, i.e. PES signals. Pending Application having Ser. No. 10/185,125, filed on Jun. 27, 2002, assigned to the common assignee hereof, teaches a method to calibrate a tape drive wherein servo signal ratios in combination with independent sensor signals are detected and digital waveforms formed therefrom. Those digital waveforms are filtered using the real and imaginary components of those waveforms at selected frequencies. Those filtered waveforms are then used to calibrate one or more index positions, i.e. PES signals.

As those skilled in the art will appreciate, the calibration curves formed by these various calibration procedures are subsequently used for "track following." When reading information from, and/or writing information to, a magnetic tape, the tape head must accurately and precisely follow a specified data track, i.e. a selected index position. During such read/write operations, the servo detector provides servo signal ratios, i.e. position error signals ("PESs") to the servo logic. The servo logic compares the measured PES signals with the previously-generated calibration curve, to determine if the desired data track is being properly followed.

In the event the servo logic determines that the position of the tape head must be changed to properly align that tape head with the moving tape, the logic uses the calibration curve to determine how large a corrective action is needed, i.e. to determine the corrective action signal to provide to the servo loop. In order to determine that corrective action signal, the logic uses not only the instantaneous PES position, the instantaneous IPS signal, and the corresponding calculated datapoint from the calibration curve, but also the slope of the calibration curve to set the magnitude of the corrective action signal.

Applicants have found that the accuracy of the slope of the calibration curve in combination with the accuracy of the individual calculated datapoints comprising that calibration curve, to be critical. Therefore, in certain embodiments Applicants' invention includes a method to refine a calculated calibration curve to more accurately recite individual datapoints, and to also recite a more accurate slope throughout that calibration curve.

Figure 5:
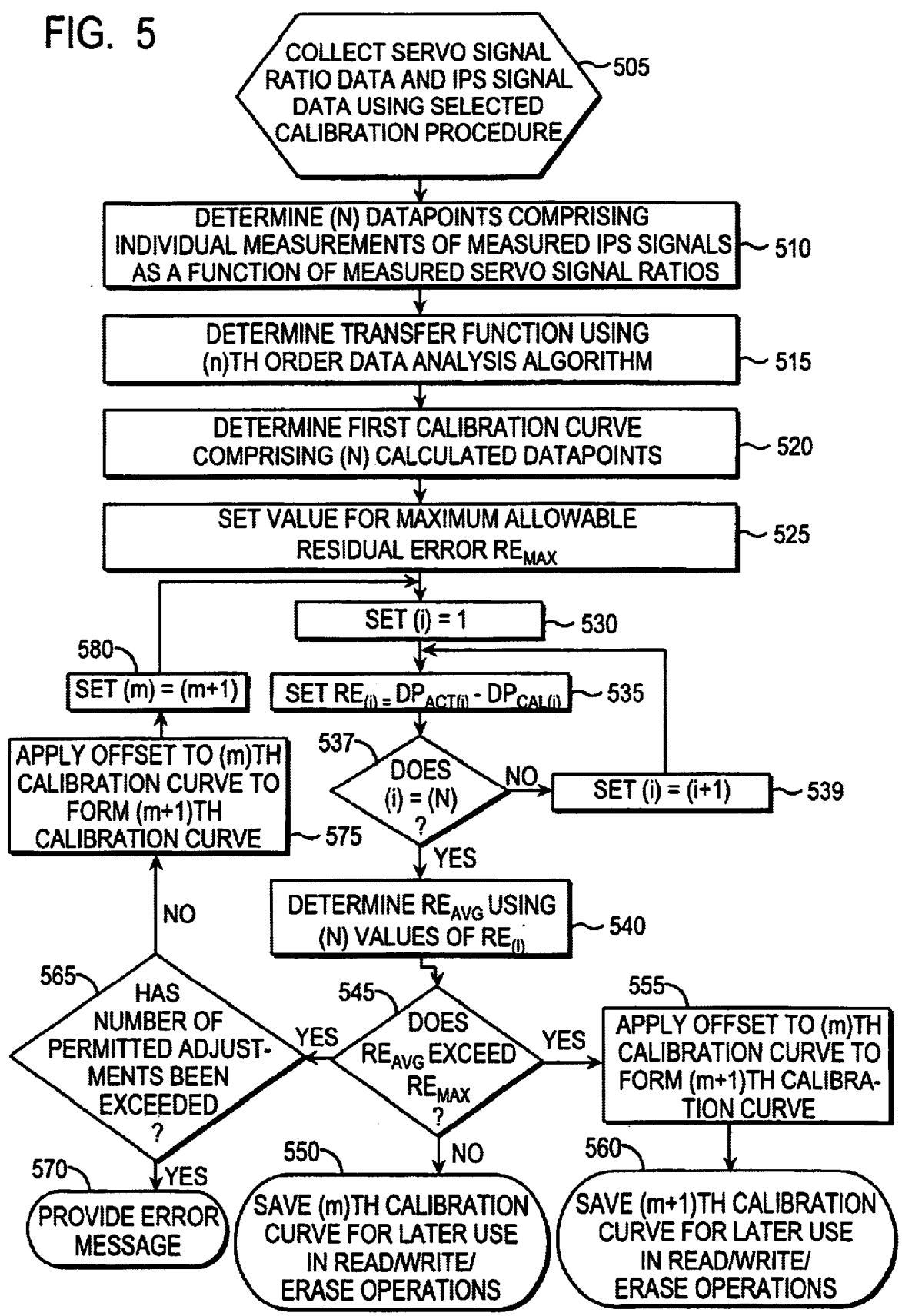
FIG. 5 is a flow chart summarizing the steps of one embodiment of Applicants' method.

FIG. 5 summarizes the steps of Applicants' method to calibrate a transducer, i.e. a servo sensor, in a noisy environment, i.e. a moving magnetic tape. In step 505, Applicants' method calibrates one or more servo sensors disposed on a tape head, such as tape head 190, in a calibration procedure. A number of such calibration procedures are discussed above. In that calibration procedure, sometimes referred to as cartridge initialization, Applicants' method collects detected servo signal ratio data in combination with measured IPS signal data. In certain embodiments, step 505 is performed by servo the servo system logic, such as logic 160.

Applicants' method transitions from step 505 to step 510 wherein a plurality of datapoints comprising individual measured IPS signals are determined for a corresponding plurality of measured servo signal ratios. In certain embodiments, step 510 is performed by servo the servo system logic, such as logic 160 (FIG. 1).

Applicants' method transitions from step 510 to step 515 wherein Applicants' method determines a transfer function using the plurality of measured datapoints obtained in step 510 and an (n)th order data regression algorithm, wherein (n) is greater than or equal to 1 and less than or equal to about 6. In certain embodiments, step 515 includes using a second order curve fitting algorithm. In certain embodiments, step 515 includes using a third order curve fitting algorithm. In certain embodiments, step 515 includes using a fourth order curve fitting algorithm. In certain embodiments, step 520 is performed by the servo system logic, such as logic 160.

Applicants method transitions from step 515 to step 520 wherein Applicants' method uses the transfer function of step 515 to plot a first calibration curve having a first slope component. In certain embodiments, step 520 is performed by servo the servo system logic, such as logic 160.

Applicants' method thereafter examines the first calibration curve of step 520 point by point to ascertain the accuracy of that calculated curve with respect to the actual datapoints of step 510. The difference between a calculated datapoint and an actual datapoint comprises residual error. In certain embodiments of Applicants invention, tape head 190 comprises a magneto-resistive reader. Applicants have found that the residual error described above arises partially or largely from point defects in the magneto-resistive reader structure. Applicants' method identifies any points of residual error embodied in the first calibration curve, and refines that calibration curve to minimize, or eliminate, those points of residual error.

In step 525, Applicants' method sets a value for the maximum allowable deviation, i.e. the maximum allowable Residual Error $RE_{MAX}$. In certain embodiments, the value of $RE_{MAX}$ is set in firmware disposed in logic 160 (FIG. 1). In certain embodiments, the value of $RE_{MAX}$ is set by Applicants' method based upon, for example, the electrical noise present in the servo loop system. In certain embodiments, the value of $RE_{MAX}$ is set upon system initialization by field service personnel. In certain embodiments, the value of $RE_{MAX}$ is provided by an attached host computer.

Applicants' method transitions from step 525 to step 530 wherein Applicants' method selects a specified calculated datapoint and the corresponding measured datapoint, i.e. sets (i) equal to 1. Applicants' method transitions from step 530 to step 535 wherein the residual error $RE_{(i)}$ for the (i)th calculated datapoint is determined, using the equation $RE_{(i)} = DP_{ACT(i)} - DP_{CAL(i)}$. In certain embodiments, step 535 is performed by servo the servo system logic, such as logic 160. Applicants' method transitions from step 535 to step 537 wherein Applicants' method determines if (i) equals (N). If Applicants' method determines in step 537 that (i) does not equal (N), then Applicants' method transitions from step 537 to step 539 wherein (i) is incremented. Applicants' method transitions from step 539 to step 535.

Alternatively, if Applicants' method determines in step 537 that (i) does equal (N), then Applicants' method transitions from step 537 to step 540 wherein Applicants' method determines an average value, $RE_{AVG}$, for the (N) values of $RE_{(i)}$. In certain embodiments, step 540 is performed by servo the servo system logic, such as logic 160. Applicants' method transitions from step 540 to step 545 wherein Applicants' method compares the value of $RE_{MAX}$ set in step 525 to the value of $RE_{AVG}$ calculated in step 540 to determine if $RE_{AVG}$ exceeds $RE_{MAX}$. In certain embodiments, step 545 is performed by servo the servo system logic, such as logic 160.

If Applicants' method determines in step 545 that $RE_{AVG}$ does not exceed $RE_{MAX}$, then Applicants' method transitions from step 545 to step 550 wherein Applicants' method saves the first calibration curve for later use to track follow in, for example, a read/write/erase operation. On the other hand, if Applicants' method determines in step 545 that $RE_{AVG}$ exceeds $RE_{MAX}$, then in certain embodiments Applicant' method transitions from step 545 to step 555. Alternatively, if Applicants' method determines in step 545 that $RE_{AVG}$ exceeds $RE_{MAX}$, then in certain embodiments Applicant' method transitions from step 545 to step 565.

In step 555, Applicants' method forms the (m+1)th, i.e. in this embodiment the second, calibration curve by applying an offset to the (m)th, i.e. in this embodiment the first calibration curve. In certain embodiments, that offset is generated by establishing a target position. The sampled servo signal/IPS signal data is used to determine a servo signal ratio corresponding to that target position. This ratio is used an an input to the transfer function which calculates a reference position. The offset equals the reference position minus the target position. Thereafter, Applicants' method transitions from step 555 to step 560 wherein the second calibration curve is saved for later use to track follow in, for example, a read/write/erase operation.

In the embodiment of Applicants' method which includes steps 565, 575, and 580, Applicants' method includes allowing a total of (M) iterative adjustments to the calibration curve formed in step 520. In step 565, Applicants' method determines if those (M) adjustments have already been made. If Applicants' method determines in step 565 that the maximum number of adjustments to the first calibration curve have already been made, then Applicants' method transitions from step 565 to step 570 wherein Applicants' method provides an error message that the transfer function of step 515 is not useable for track following.

Alternatively, if Applicants' method determines in step 565 that the maximum number of adjustments have not been made, then Applicants' method transitions from step 565 to step 575 wherein an offset is applied to the (m)th calibration curve to form the (m+1)th calibration curve. Applicants' method transitions from step 575 to step 580 wherein the value of (m) is incremented. Applicants' method then transitions from step 580 to step 530. Thereafter, Applicants' method determines the residual error of the (m+1)th calibration curve as described above.

Figure 6A:
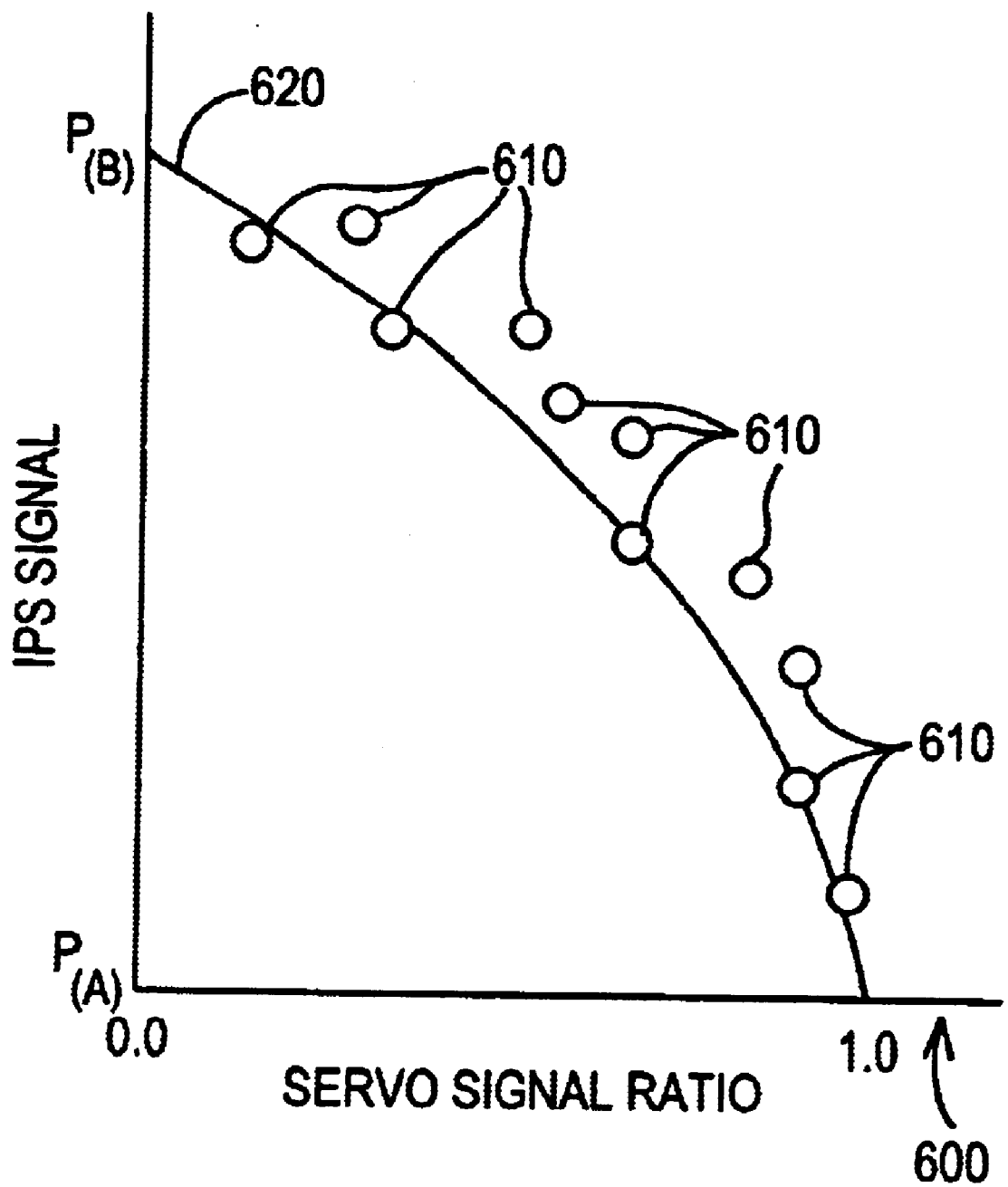
FIG. 6A graphically depicts a number of measured datapoints and calibrated transfer function curve.
Figure 6B:
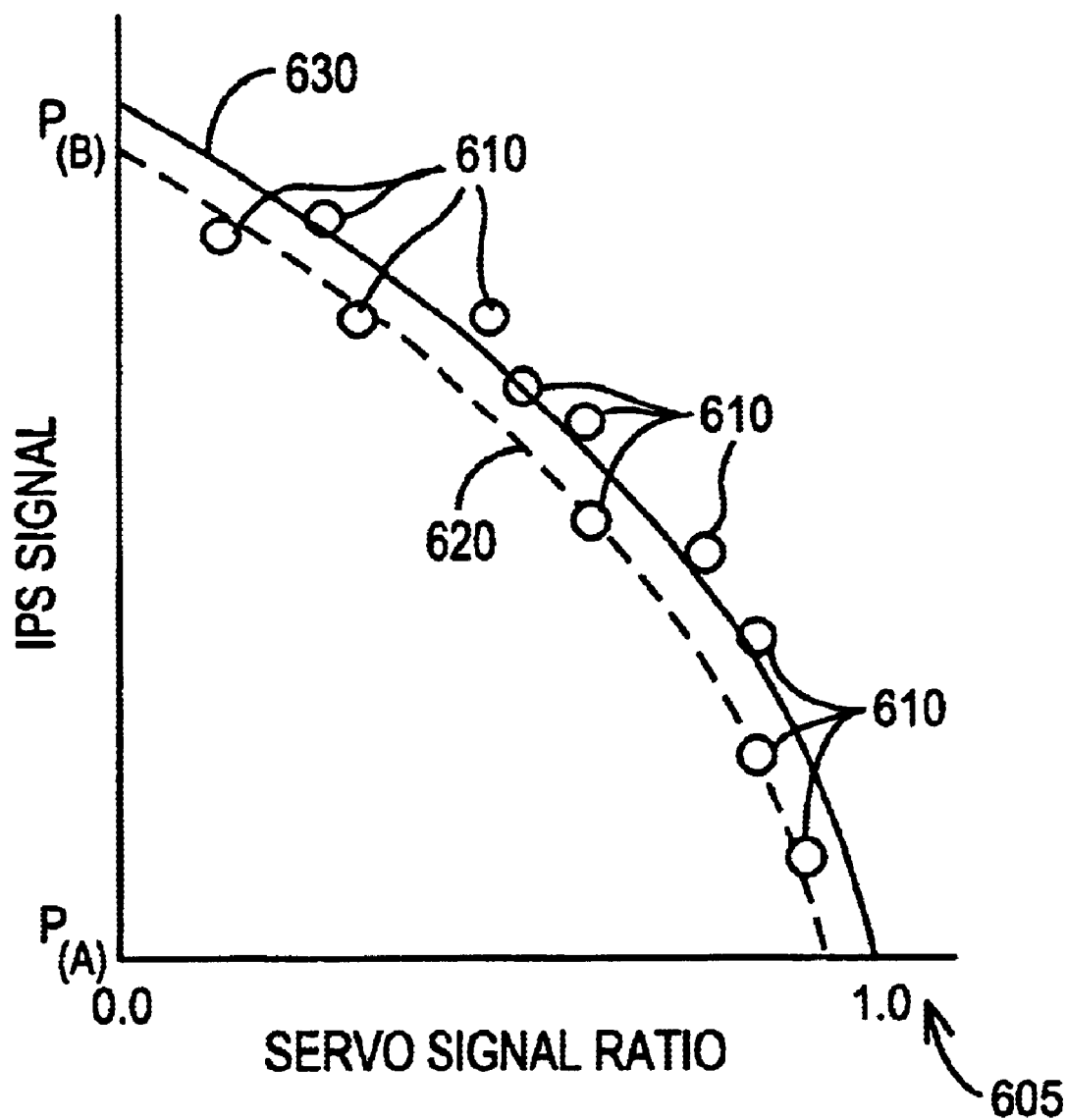
FIG. 6B graphically depicts a portion of a second calibration curve formed using the first calibration curve of FIG. 6A and an offset.

Referring now to FIGS. 5, 6A, and 6B, graph 600 shows a plurality of measured datapoints 610 and curve 620 formed from the transfer function of step 515. In step 535, Applicants' method determines the residual error, $RE_{(i)}$, for each of (N) measured datapoints 610 with respect to the corresponding calculated datapoints comprising curve 620. If the average residual error, $RE_{AVG}$, calculated from those (N) values of $RE_{(i)}$ exceeds $RE_{MAX}$, then an offset is applied to curve 620, i.e. curve 620 is "shifted."

Referring now to FIG. 6B, graph 605 shows the plurality of measured datapoints 610, first calibration curve 620, and second calibration curve 630, i.e. the "shifted" curve. As described above, in certain embodiments curve 630 comprises the second calibration curve which is saved for future use. In other embodiments, curve 630 comprises the (m+1)th calibration curve which is analyzed to determine the residual error remaining therein.

Figure 7:
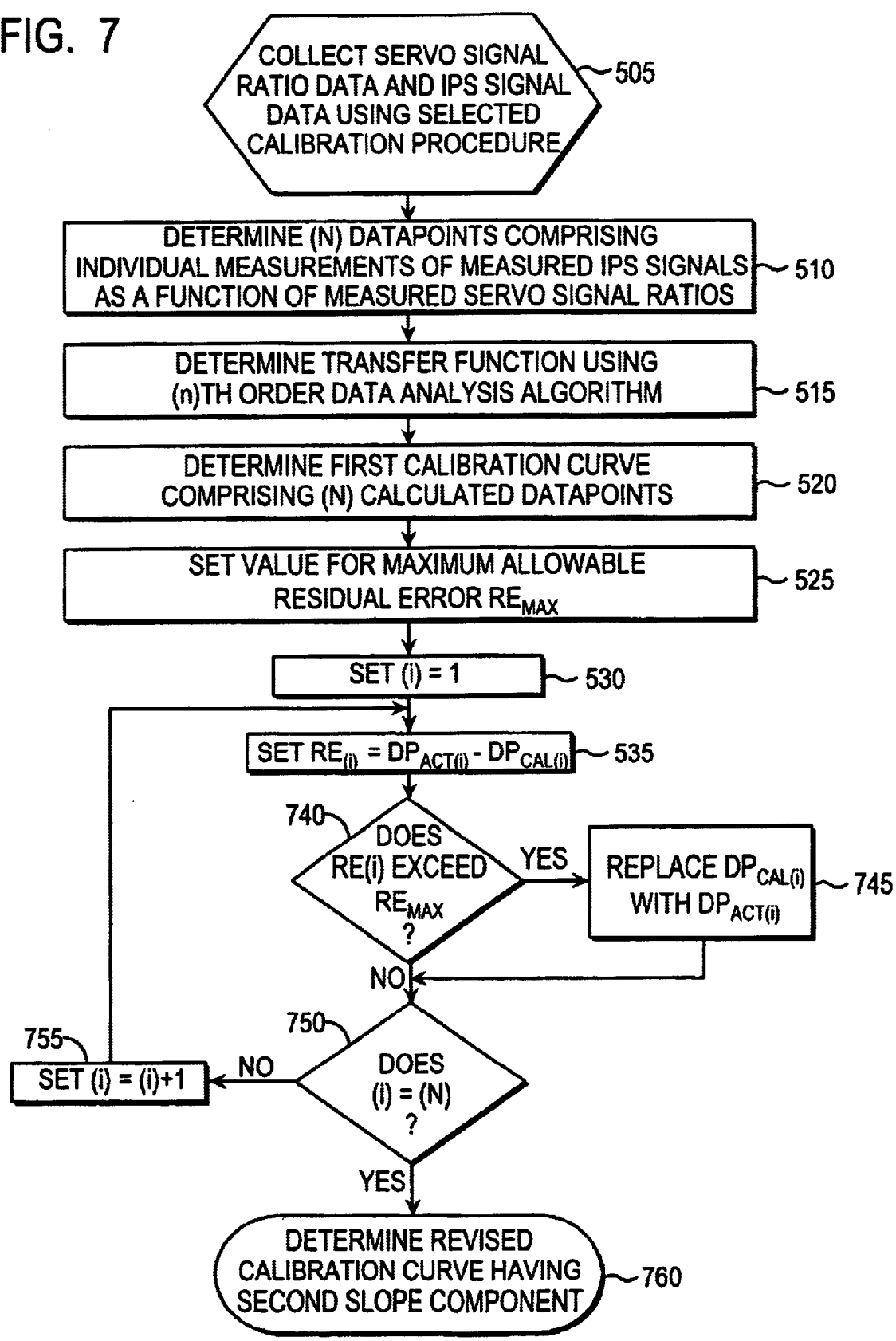
FIG. 7 is a flow chart summarizing the steps of a second embodiment of Applicants' method.

Referring now to FIG. 7, in certain embodiments Applicants' method transitions from step 535 to step 740, wherein Applicants' method compares $RE_{(i)}$ determined in step 735 with $RE_{MAX}$ set in step 525. If Applicants' method determines in step 740 that $RE_{(i)}$ is less than $RE_{MAX}$, then Applicants' method transitions from step 740 to step 750. In certain embodiments, step 740 is performed by servo the servo system logic, such as logic 160.

Alternatively, if Applicants' method determines in step 740 that $RE_{(i)}$ is greater than or equal to $RE_{MAX}$, then Applicants' method transitions from step 740 to step 745 wherein calculated $DP_{CAL(i)}$ is replaced with measured datapoint $DP_{ACT(i)}$. In certain embodiments, step 745 is performed by servo the servo system logic, such as logic 160. Applicants' method transitions from step 745 to step 750 wherein Applicants' method determines if all the calculated datapoints of step 520 have been compared to the corresponding measured datapoints of step 510, i.e. determines if (i) equals (N). In certain embodiments, step 750 is performed by servo the servo system logic, such as logic 160.

If Applicants' method determines in step 750 that (i) does not equal (N), then Applicants' method transitions from step 750 to step 755 wherein (i) is incremented. In certain embodiments, step 755 is performed by servo the servo system logic, such as logic 160. Thereafter, Applicants' method transitions from step 755 to step 535.

Alternatively, if Applicants' method determines in step 750 that (i) equals (N), then Applicants' method transitions from step 750 to step 760 wherein Applicants' method forms a second calibration curve having a second slope component. For example and referring now to FIGS. 7, 8A, and 8B, graph 800 (FIG. 6A) recites first calibration curve 820 (FIG. 8A), formed in step 520 (FIGS. 5, 7). Graph 800 further recites a plurality of measured datapoints (open circles) obtained in step 510 (FIGS. 5, 7). For illustrative purposes, assume the residual error determined in step 535 (FIGS. 5, 7) for calculated datapoints (closed circles) 822, 823, 824, 825, and 826, with respect to measured datapoints 812, 813, 814, 815, and 816, respectively, exceeds the value of $RE_{MAX}$ set in step 525 (FIGS. 5, 7).

Figures 8A, 8B:
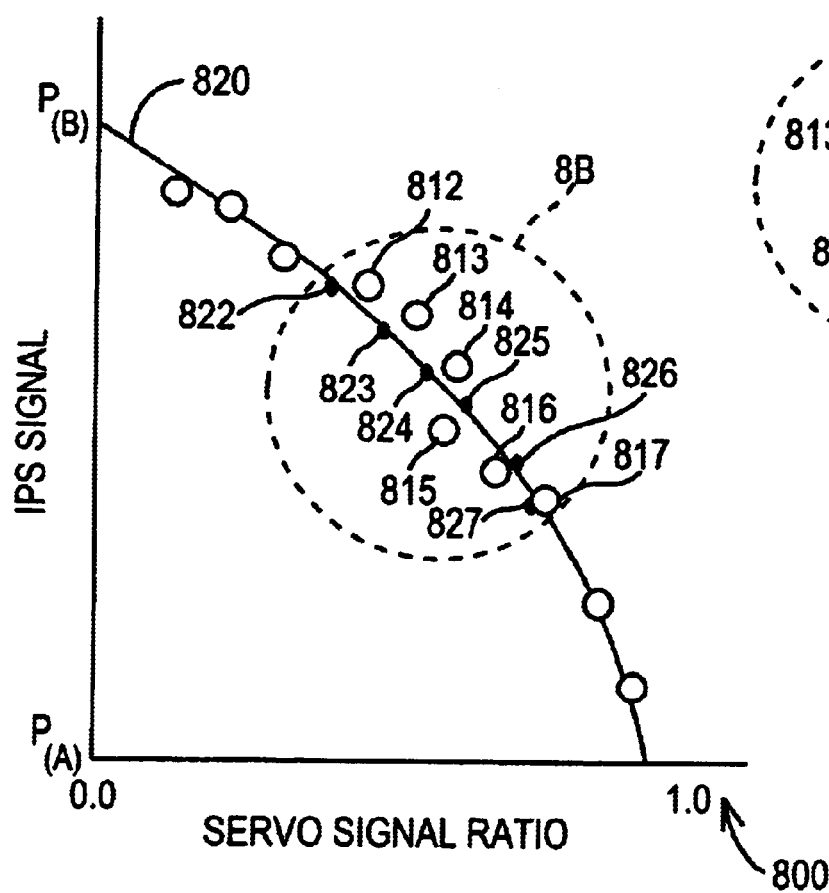
FIG. 8A graphically depicts a number of measured datapoints and a first calibration curve comprising datapoints determined using a calculated transfer function.
FIG. 8B graphically depicts a portion of a second calibration curve which includes a portion of the first calibration curve of FIG. 6A and which further includes both measured datapoints and calculated datapoints.
Figure 8A:
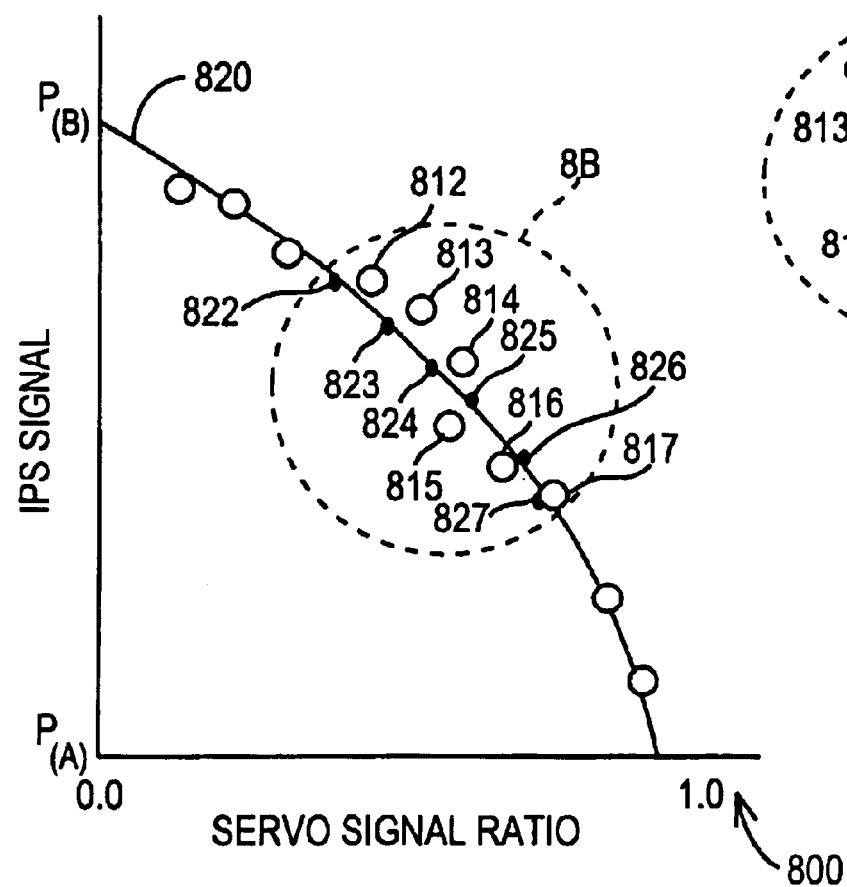
Figure 8B:
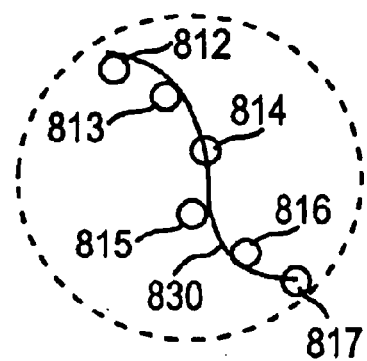

In step 745 (FIG. 7), Applicants' method refines portion 821 (FIG. 8A) of first calibration curve 820 (FIG. 8A) by replacing $DP_{CAL(822)}$, $DP_{CAL(823)}$, $DP_{CAL(824)}$, $DP_{CAL(825)}$, and $DP_{CAL(826)}$, respectively, with $DP_{ACT(812)}$, $DP_{ACT(813)}$, $DP_{ACT(814)}$, $DP_{ACT(815)}$, and $DP_{ACT(816)}$, respectively, to form new curve portion 830 (FIG. 8B). Thus, in step 745 (FIG. 5), Applicants' method refines first calibration curve 820 to replace one or more portions of that first calibration curve having a first slope, with one or more refined curve portions, such as portion 830, having a second slope component. In certain embodiments, step 745 is performed by servo the servo system logic, such as logic 160. Subsequently, the refined calibration curve of step 760 is used for tracking following when reading and/or writing information to tape 197 using head 190.

Applicants' invention further includes an article of manufacture comprising a computer useable medium having computer readable program code disposed therein method to calibrate a servo sensor disposed on a tape head disposed adjacent a moving magnetic tape, where the magnetic tape includes at least one servo edge comprising an interface between a first recorded signal and a second recorded signal, and where the servo sensor detects the first recorded signal and the second recorded signal and provides a servo signal comprising the ratio of the detected first recorded frequency and the detected second recorded frequency, and where an independent position sensor provides an IPS signal comprising the lateral position of the tape head with respect to the tape path.

Applicants' invention further includes a computer program product usable with a programmable computer processor having computer readable program code embodied therein method to calibrate a servo sensor disposed on a tape head disposed adjacent a moving magnetic tape, where the magnetic tape includes at least one servo edge comprising an interface between a first recorded signal and a second recorded signal, and where the servo sensor detects the first recorded signal and the second recorded signal and provides a servo signal comprising the ratio of the detected first recorded frequency and the detected second recorded frequency, and where an independent position sensor provides an IPS signal comprising the lateral position of the tape head with respect to the tape path.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to calibrate a servo sensor disposed on a tape head disposed adjacent a moving magnetic tape, wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, said method comprising the steps of:

sampling said servo signal and said IPS signal to form servo signal/IPS signal data as said tape moves adjacent said servo sensor;

determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

calculating a transfer function using said (N) datapoints and an (n)th order curve fitting algorithm, wherein (n) is greater than or equal to 1 and less than or equal to about 6;

forming a first calibration curve comprising (N) calculated datapoints $DP_{CAL(i)}$ using said transfer function;

setting a value for the maximum allowable residual error $RE_{MAX}$;

computing (N) residual error values, wherein the residual error $RE_{(i)}$ for the (i)th one of said (N) calculated datapoints $DP_{CAL(i)}$ equals $DP_{ACT(i)}-DP_{CAL(i)}$;

adjusting said first calibration curve to form a second calibration curve based upon said (N) residual error values.

2. The method of claim 1, further comprising the steps of:

establishing a maximum number of permitted adjustments to said first calibration curve;

determining if said maximum number of adjustments have been made; and operative if said maximum number of adjustments have been made, providing an error message.

3. The method of claim 1, further comprising the steps of:

calculating the average residual error $RE_{AVG}$ by averaging the values for $RE_{(i)}$;

determining if $RE_{AVG}$ exceeds $RE_{MAX}$; and operative if $RE_{AVG}$ exceeds $RE_{MAX}$, applying an offset to each of said (N) $DP_{CAL(i)}$ datapoints to form said second calibration curve.

4. The method of claim 3, further comprising the step of determining the residual error remaining in said second calibration curve.

5. The method of claim 1, further comprising the steps of:

determining for each value of (i) if $RE_{(i)}$ is greater than $RE_{MAX}$;

operative if $RE_{(i)}$ is greater than $RE_{MAX}$, replacing $DP_{CAL(i)}$ with $DP_{ACT(i)}$; and forming a second calibration curve comprising one or more $DP_{ACT(i)}$.

6. The method of claim 1, further comprising the steps of:

moving said magnetic tape; and using said second calibration curve to position said tape head adjacent said moving magnetic tape.

7. The method of claim 6, further comprising the step of reading information from said magnetic tape.

8. The method of claim 6, further comprising the step of writing information to said magnetic tape.

9. The method of claim 1, further comprising the steps of:

providing a memory device; and storing at a first time said second calibration curve in said memory device.

10. The method of claim 9, further comprising the steps of:

providing servo logic; and providing said second calibration curve to said servo logic at a second time.

11. A method to calibrate a servo sensor disposed on a tape head disposed adjacent a moving magnetic tape, wherein said tape head is capable of communicating with servo logic, and wherein said servo logic is capable of communicating with a memory device, and wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, said method comprising the steps of:

moving said magnetic tape;

sampling said servo signal and said IPS signal to form servo signal/IPS signal data as said tape moves adjacent said servo sensor;

determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

calculating a transfer function using said (N) datapoints and a third order curve fitting algorithm;

forming a first calibration curve comprising (N) calculated datapoints $DP_{CAL(i)}$ using said transfer function;

setting a value for the maximum allowable residual error $RE_{MAX}$;

computing (N) residual error values, wherein the residual error $RE_{(i)}$ for the (i)th one of said (N) calculated datapoints $DP_{CAL(i)}$ equals $DP_{ACT(i)}-DP_{CAL(i)}$;

calculating the average residual error $RE_{AVG}$ by averaging said (N) residual error values;

determining if $RE_{AVG}$ exceeds $RE_{MAX}$; and operative if $RE_{AVG}$ exceeds $RE_{MAX}$, applying an offset to each of said (N) $DP_{CAL(i)}$ datapoints to form said second calibration curve;

storing said second calibration curve at a first time in said memory device;

providing said second calibration curve at a second time;

using said second calibration curve to position said tape head adjacent said moving magnetic tape; and reading and/or writing information from and/or to said magnetic tape using said tape head.

12. An article of manufacture comprising a computer useable medium having computer readable program code disposed therein for calibrating a servo sensor disposed on a tape head disposed adjacent a moving magnetic tape, wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, the computer readable program code comprising a series of computer readable program steps to effect:

sampling said servo signal and said IPS signal to form servo signal/IPS signal data as said tape moves adjacent said servo sensor;

determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

calculating a transfer function using said (N) datapoints and an (n)th order curve fitting algorithm, wherein (n) is equal to or greater than 1 and less than or equal to about 6;

forming a first calibration curve comprising (N) calculated datapoints $DP_{CAL(i)}$ using said transfer function;

setting a value for the maximum allowable residual error $RE_{MAX}$;

computing (N) residual error values, wherein the residual error $RE_{(i)}$ for the (i)th one of said (N) calculated datapoints $DP_{CAL(i)}$ equals $DP_{ACT(i)}-DP_{CAL(i)}$;

adjusting said first calibration curve to form a second calibration curve based upon said (N) residual error values.

13. The article of manufacture of claim 12, wherein said computer readable program code further comprises a series of computer readable program steps to effect:

accessing a pre-determined value for the maximum number of permitted adjustments to said first calibration curve;

determining if said maximum number of adjustments have been made; and operative if said maximum number of adjustments have been made, providing an error message.

14. The article of manufacture of claim 12, wherein said computer readable program code further comprises a series of computer readable program steps to effect:

calculating the average residual error $RE_{AVG}$ by averaging the values for $RE_{(i)}$;

determining if $RE_{AVG}$ exceeds $RE_{MAX}$; and operative if $RE_{AVG}$ exceeds $RE_{MAX}$, applying an offset to each of said (N) $DP_{CAL(i)}$ datapoints to form said second calibration curve.

15. The article of manufacture of claim 12, wherein said computer readable program code further comprises a series of computer readable program steps to effect determining the residual error remaining in said second calibration curve.

16. The article of manufacture of claim 12, wherein said computer readable program code further comprises a series of computer readable program steps to effect:

determining for each value of (i) if $RE_{(i)}$ is greater than $RE_{MAX}$;

operative if $RE_{(i)}$ is greater than $RE_{MAX}$, replacing $DP_{CAL(i)}$ with $DP_{ACT(i)}$; and forming a second calibration curve comprising one or more $DP_{ACT(i)}$.

17. The article of manufacture of claim 12, wherein said computer readable program code further comprises a series of computer readable program steps to effect:

moving said magnetic tape; and using said second calibration curve to position said tape head adjacent said moving magnetic tape.

18. The article of manufacture of claim 17, wherein said computer readable program code further comprises a series of computer readable program steps to effect reading information from said magnetic tape.

19. The article of manufacture of claim 17, wherein said computer readable program code further comprises a series of computer readable program steps to effect writing information to said magnetic tape.

20. The article of manufacture of claim 12, wherein said article of manufacture further comprises a memory device, wherein said computer readable program code further comprises a series of computer readable program steps to effect storing at a first time said second calibration curve in said memory device.

21. The article of manufacture of claim 20, wherein said article of manufacture further comprises servo logic, wherein said computer readable program code further comprises a series of computer readable program steps to effect providing said second calibration curve to said servo logic at a second time.

22. An article of manufacture comprising a computer useable medium having computer readable program code disposed therein for calibrating a servo sensor disposed on a tape head disposed adjacent a moving magnetic tape, wherein said tape head is capable of communicating with servo logic, and wherein said servo logic is capable of communicating with a memory device, and wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, the computer readable program code comprising a series of computer readable program steps to effect:

moving said magnetic tape;

sampling said servo signal and said IPS signal to form servo signal/IPS signal data as said tape moves adjacent said servo sensor;

determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

calculating a transfer function using said (N) datapoints and a third order curve fitting algorithm;

forming a first calibration curve comprising (N) calculated datapoints $DP_{CAL(i)}$ using said transfer function;

setting a value for the maximum allowable residual error $RE_{MAX}$;

computing (N) residual error values, wherein the residual error $RE_{(i)}$ for the (i)th one of said (N) calculated datapoints $DP_{CAL(i)}$ equals $DP_{ACT(i)}-DP_{CAL(i)}$;

calculating the average residual error $RE_{AVG}$ by averaging said (N) residual error values;

determining if $RE_{AVG}$ exceeds $RE_{MAX}$; and operative if $RE_{AVG}$ exceeds $RE_{MAX}$, applying an offset to each of said (N) $DP_{CAL(i)}$ datapoints to form said second calibration curve;

storing said second calibration curve at a first time in said memory device;

providing said second calibration curve to said logic at a second time;

using said second calibration curve to position said tape head adjacent said moving magnetic tape; and reading and/or writing information from and/or to said magnetic tape using said tape head.

23. A computer program product usable with a programmable computer processor having computer readable program code embodied therein to calibrate a servo sensor disposed on a tape head disposed adjacent a moving magnetic tape, wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, comprising:

computer readable program code which causes said programmable computer processor to sample said servo signal and said IPS signal to form servo signal/IPS signal data as said tape moves adjacent said servo sensor;

computer readable program code which causes said programmable computer processor to determine (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

computer readable program code which causes said programmable computer processor to calculate a transfer function using said (N) datapoints and an (n)th order curve fitting algorithm, wherein (n) is equal to or greater than 1 and less than or equal to about 6;

computer readable program code which causes said programmable computer processor to form a first calibration curve comprising (N) calculated datapoints $DP_{CAL(i)}$ using said transfer function;

computer readable program code which causes said programmable computer processor to access a predetermined value for the maximum allowable residual error $RE_{MAX}$ for each of said (N) calculated datapoints;

computer readable program code which causes said programmable computer processor to compute (N) residual error values, wherein the residual error $RE_{(i)}$ for the (i)th one of said (N) calculated datapoints $DP_{CAL(i)}$ equals $DP_{ACT(i)} - DP_{CAL(i)}$;

computer readable program code which causes said programmable computer processor to adjust said first calibration curve to form a second calibration curve based upon said (N) residual error values.

24. The computer program product of claim 23, further comprising:
computer readable program code which causes said programmable computer processor to access a predetermined value for the maximum number of permitted adjustments to said first calibration curve;
computer readable program code which causes said programmable computer processor to determine if said maximum number of adjustments have been made; and
computer readable program code which, if said maximum number of adjustments have been made, causes said programmable computer processor to provide an error message.

25. The computer program product of claim 23, further comprising:
computer readable program code which causes said programmable computer processor to calculate the average residual error $RE_{AVG}$ by averaging the values for $RE_{(i)}$;
computer readable program code which causes said programmable computer processor to determine if $RE_{AVG}$ exceeds $RE_{MAX}$; and
computer readable program code which, if $RE_{AVG}$ exceeds $RE_{MAX}$, causes said programmable computer processor to apply an offset to each of said (N) $DP_{CAL(i)}$ datapoints to form said second calibration curve.

26. The computer program product of claim 25, further comprising computer readable program code which causes said programmable computer processor to determine the residual error remaining in said second calibration curve.

27. The computer program product of claim 23, further comprising:
computer readable program code which causes said programmable computer processor to determine for each value of (i) if $RE_{(i)}$ is greater than $RE_{MAX}$;
computer readable program code which, if $RE_{(i)}$ is greater than $RE_{MAX}$, causes said programmable computer processor to replace $DP_{CAL(i)}$ with $DP_{ACT(i)}$; and computer readable program code which causes said programmable computer processor to form a second calibration curve comprising one or more $DP_{ACT(i)}$.

28. The computer program product of claim 23, further comprising:
computer readable program code which causes said programmable computer processor to move said magnetic tape; and
computer readable program code which causes said programmable computer processor to use said second calibration curve to position said tape head adjacent said moving magnetic tape.

29. The computer program product of claim 28, further comprising computer readable program code which causes said programmable computer processor to read information from said magnetic tape.

30. The computer program product of claim 28, further comprising computer readable program code which causes said programmable computer processor to write information to said magnetic tape.

31. The computer program product of claim 23, further comprising computer readable program code which causes said programmable computer processor to store at a first time said second calibration curve in a memory device.

32. The computer program product of claim 31, further comprising computer readable program code which causes said programmable computer processor to provide said second calibration curve to servo logic at a second time.

33. A computer program product usable with a programmable computer processor having computer readable program code embodied therein to calibrate a servo sensor disposed on a tape head disposed adjacent a moving magnetic tape, wherein said tape head is capable of communicating with servo logic, and wherein said servo logic is capable of communicating with a memory device, and wherein said magnetic tape includes at least one servo edge comprising an interface between a first recorded signal and a second recorded signal, wherein said servo sensor detects said first recorded signal and said second recorded signal, and wherein a servo detector provides a servo signal comprising the ratio of the detected first recorded frequency and the detected second recorded frequency, and wherein an independent position sensor provides an IPS signal comprising the lateral position of said tape head with respect to the tape path, comprising:
computer readable program code which causes said programmable computer processor to move said magnetic tape;
computer readable program code which causes said programmable computer processor to sample said servo signal and said IPS signal to form servo signal/IPS signal data as said tape moves adjacent said servo sensor;
computer readable program code which causes said programmable computer processor to determine (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);
computer readable program code which causes said programmable computer processor to calculate a transfer function using said (N) datapoints and a third order curve fitting algorithm;
computer readable program code which causes said programmable computer processor to form a first calibration curve comprising (N) calculated datapoints $DP_{CAL(i)}$ using said transfer function;

computer readable program code which causes said programmable computer processor to access a pre-determined value for the maximum allowable residual error $RE_{MAX}$ for each of said (N) calculated datapoints;

computer readable program code which causes said programmable computer processor to compute (N) residual error values, wherein the residual error $RE_{(i)}$ for the (i)th one of said (N) calculated datapoints $DP_{CAL(i)}$ equals $DP_{ACT(i)}-DP_{CAL(i)}$;

computer readable program code which causes said programmable computer processor to calculate the average residual error $RE_{AVG}$ by averaging the values for $RE_{(i)}$;

computer readable program code which causes said programmable computer processor to determine if $RE_{AVG}$ exceeds $RE_{MAX}$; and computer readable program code which, if $RE_{AVG}$ exceeds $RE_{MAX}$, causes said programmable computer processor to apply an offset to each of said (N) $DP_{CAL(i)}$ datapoints to form said second calibration curve;

computer readable program code which causes said programmable computer processor to store said second calibration curve at a first time in said memory device;

computer readable program code which causes said programmable computer processor to provide said second calibration curve at a second time;

computer readable program code which causes said programmable computer processor to use said second calibration curve to position said tape head adjacent said moving magnetic tape; and computer readable program code which causes said programmable computer processor to read and/or write information from and/or to said magnetic tape using said tape head.

34. A tape drive for reading and/or writing information to a magnetic tape, wherein said magnetic tape comprises at least one or more continuous servo edges comprising an interface between a first recorded signal and a second recorded signal, comprising:

a motion system capable of moving said magnetic tape alternatingly in a first direction and an opposing second direction along a first axis;

a tape head capable of moving alternatingly in a third direction and an opposing fourth direction along a second axis, wherein said first axis and said second axis are substantially orthogonal, one or more servo sensors disposed on said tape head, wherein each of said one or more servo sensors are capable of detecting said first recorded signal and said second recorded signal;

a servo detector, wherein said servo detector is capable of communication with each of said one or more servo sensors and with servo logic, and wherein said servo detector provides servo signals comprising the ratio of the detected first recorded signal and the detected second recorded signal;

an independent position sensor, wherein said independent position sensor provides an IPS signal comprising a measurement of the lateral position of said tape head with respect to the tape path;

a servo loop, wherein said servo loop is capable of moving said tape head in said third direction and in said fourth direction;

a memory device;

logic, wherein said logic is capable of communicating with said servo detector, said memory device, said independent position sensor, and said servo loop, said logic:

sampling said servo signal and said IPS signal to form servo signal/IPS signal data as said tape moves adjacent said servo sensor;

determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);

calculating a transfer function using said (N) datapoints and an (n)th order curve fitting algorithm, wherein (n) is greater than or equal to 1 and less than or equal to about 6;

forming a first calibration curve comprising (N) calculated datapoints $DP_{CAL(i)}$ using said transfer function;

setting a value for the maximum allowable residual error $RE_{MAX}$;

computing (N) residual error values, wherein the residual error $RE_{(i)}$ for the (i)th one of said (N) calculated datapoints $DP_{CAL(i)}$ equals $DP_{ACT(i)}-DP_{CAL(i)}$;

adjusting said first calibration curve to form a second calibration curve based upon said (N) residual error values.

35. The tape drive of claim 34, said logic:

accessing a pre-determined value for the maximum number of permitted adjustments to said first calibration curve;

determining if said maximum number of adjustments have been made; and operative if said maximum number of adjustments have been made, providing an error message.

36. The tape drive of claim 34, said logic:

calculating the average residual error $RE_{AVG}$ by averaging the values for $RE_{(i)}$;

determining if $RE_{AVG}$ exceeds $RE_{MAX}$; and operative if $RE_{AVG}$ exceeds $RE_{MAX}$, applying an offset to each of said (N) $DP_{CAL(i)}$ datapoints to form said second calibration curve.

37. The tape drive of claim 36, determining the residual error remaining in said second calibration curve.

38. The tape drive of claim 34, said logic:

determining for each value of (i) if $RE_{(i)}$ is greater than $RE_{MAX}$;

operative if $RE_{(i)}$ is greater than $RE_{MAX}$, replacing $DP_{CAL(i)}$ with $DP_{ACT(i)}$; and forming a second calibration curve comprising one or more $DP_{ACT(i)}$.

39. The tape drive of claim 34, said logic:

moving said magnetic tape; and using said second calibration curve to position said tape head adjacent said moving magnetic tape.

40. The tape drive of claim 39, said logic reading information from said magnetic tape.

41. The tape drive of claim 39, said logic writing information to said magnetic tape.

42. The tape drive of claim 34, said logic storing at a first time said second calibration curve in said memory device.

43. The tape drive of claim 42, said logic recalling said second calibration curve at a second time.

44. A tape drive for reading and/or writing information to a magnetic tape, wherein said magnetic tape comprises at least one or more continuous servo edges comprising an interface between a first recorded signal and a second recorded signal, comprising:
- a motion system capable of moving said magnetic tape alternatingly in a first direction and an opposing second direction along a first axis;
- a tape head capable of moving alternatingly in a third direction and an opposing fourth direction along a second axis, wherein said first axis and said second axis are substantially orthogonal,
- one or more servo sensors disposed on said tape head, wherein each of said one or more servo sensors are capable of detecting said first recorded signal and said second recorded signal;
- a servo detector, wherein said servo detector is capable of communication with each of said one or more servo sensors and with servo logic, and wherein said servo detector provides servo signals comprising the ratio of the detected first recorded signal and the detected second recorded signal;
- an independent position sensor, wherein said independent position sensor provides an IPS signal comprising a measurement of the lateral position of said tape head with respect to the tape path;
- a servo loop, wherein said servo loop is capable of moving said tape head in said third direction and in said fourth direction;
- a memory device;
- logic, wherein said logic is capable of communicating with said servo detector, said memory device, said independent position sensor, and said servo loop, said logic:
  - moving said magnetic tape;
  - sampling said servo signal and said IPS signal to form servo signal/IPS signal data as said tape moves adjacent said servo sensor;
  - determining (N) measured datapoints using said servo signal/IPS signal data, wherein each of the $DP_{ACT(i)}$ members of said (N) datapoints comprises a measured servo signal and a corresponding measured IPS signal, wherein (i) is an integer greater than or equal to 1 and less than or equal to (N);
  - calculating a transfer function using said (N) datapoints and a third order curve fitting algorithm;
  - forming a first calibration curve comprising (N) calculated datapoints $DP_{CAL(i)}$ using said transfer function;
  - setting a value for the maximum allowable residual error $RE_{MAX}$;
  - computing (N) residual error values, wherein the residual error $RE_{(i)}$ for the (i)th one of said (N) calculated datapoints $DP_{CAL(i)}$ equals $DP_{ACT(i)} - DP_{CAL(i)}$;
  - calculating the average residual error $RE_{AVG}$ by averaging said (N) residual error values;
  - determining if $RE_{AVG}$ exceeds $RE_{MAX}$; and
  - operative if $RE_{AVG}$ exceeds $RE_{MAX}$, applying an offset to each of said (N) $DP_{CAL(i)}$ datapoints to form said second calibration curve;
  - storing said second calibration curve at a first time in said memory device;
  - recalling said second calibration curve at a second time;
  - using said second calibration curve to position said tape head adjacent said moving magnetic tape; and
  - reading and/or writing information from and/or to said magnetic tape using said tape head.

* * * * *